RE 25137

July 7, 1959     W. B. NODWELL     2,893,787
OVERLOAD SPROCKET FOR TRACK LAYING VEHICLES
Filed May 29, 1958     2 Sheets—Sheet 1

WILLIAM BRUCE NODWELL
INVENTOR
BY
PATENT AGENT

July 7, 1959     W. B. NODWELL     2,893,787
OVERLOAD SPROCKET FOR TRACK LAYING VEHICLES
Filed May 29, 1958     2 Sheets-Sheet 2

WILLIAM BRUCE NODWELL
INVENTOR
BY
PATENT AGENT 2,893,787
Patented July 7, 1959

2,893,787
OVERLOAD SPROCKET FOR TRACK LAYING VEHICLES

William Bruce Nodwell, Calgary, Alberta, Canada

Application May 29, 1958, Serial No. 738,811

5 Claims. (Cl. 305—1)

This invention relates to mechanisms for tracked vehicles of the so-called track laying class wherein the vehicle is propelled by the action of an endless belt or tract actuated by a driving wheel. This form of actuation is especially useful in tractors, military tanks, excavators, and vehicles designed for use on snow or marshy grounds.

In vehicles of this kind the endless track is provided with a plurality of transverse divider or grouser bars which are engaged by the driving wheel by means of suitably spaced and dimensioned sprocket teeth.

The grouser bars are generally formed of metal and the sprocket teeth are generally coated with or formed solely from rubber or some other relatively resilient and thus wear resistant material.

It has been found in practice that during sudden overloading of the tracks due to the terrain traversed or other causes, the stress on the belts can become high enough that the belts will be stretched within their elastic limit. This stretching of the belt causes an extension in the pitch of the belt grouser bars and in accordance with this extended pitch the belts start climbing up the teeth of the rubber sprockets. In many cases the belts climb sufficiently up the rubber teeth that the full load of the track is placed upon the top of the teeth. Very often teeth formed of the desirably wear resistant and thus necessarily resilient material cannot bear this load on the uppermost portion only and bend inwardly causing the belt to slip.

It is the principal object of this invention to provide an actuating mechanism for such vehicles wherein the wear resistant teeth may be relieved of the load of the track when the track is subjected to unusual stress and strain.

It is another important object of this invention to provide such a mechanism as will provide for the normal drive of the track by means of the conventional rubber or other wear resistant material teeth but which will, at the same time, provide a means whereby sudden and unusual strains may be sustained by overload teeth of greater stress resistance.

Figure 1:
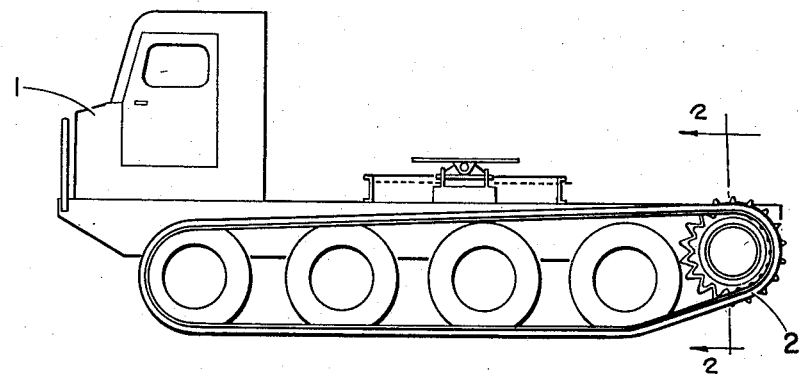
Figure 2:
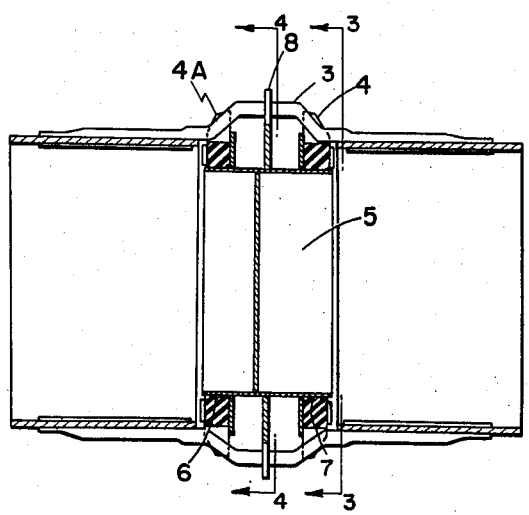
Figure 4:
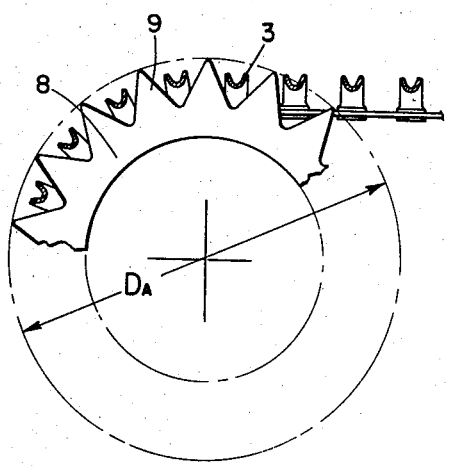
Figure 3:
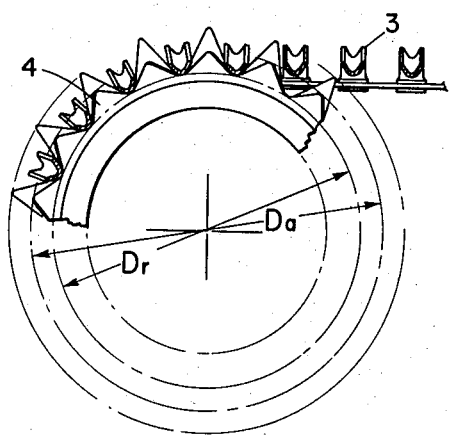
Figure 4A:
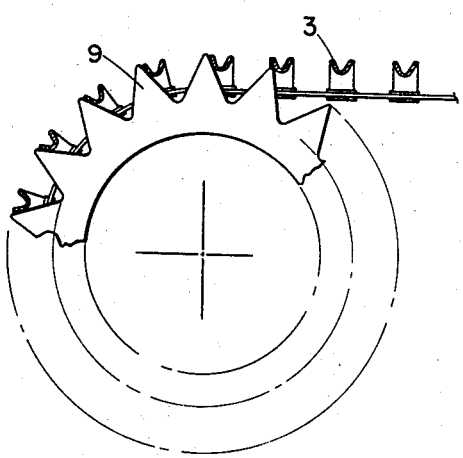
Figure 3A:
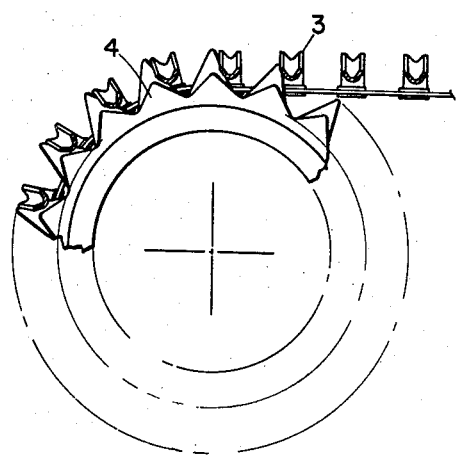

These and other advantageous objects will become apparent through a consideration of the following detailed description taken in conjunction with the attached drawings in which Figure 1 is a side elevation of a tracked vehicle illustrating the method of application of the invention, Figure 2 is a partial vertical section taken through line 2—2 in Figure 1, Figure 3 is a section taken along line 3—3 of Figure 2 under normal operating conditions of the vehicle, Figure 3A is a view taken along line 3—3 of Figure 2 under conditions of abnormally high load or stress on the belt, Figure 4 is a section taken along line 4—4 of Figure 2 under normal operating conditions, and Figure 4A is a section taken along line 4—4 of Figure 2 under conditions of abnormally high track stress.

The invention consists broadly in the addition to a self laying track mechanism which includes a driving wheel, a track with transverse grouser bars adapted to be driven thereby, and a pair of axially spaced apart sprockets of relatively resilient and wear resistant material having driving teeth thereon adapted to engage grouser bars on the tracks, of an intermediate overload sprocket located between the two axially spaced apart sprockets having teeth in axial alignment with each pair of driving teeth and being of the same root diameter but of greater addendum diameter than the driving teeth, the intermediate teeth being formed of the material having a greater load resistance to the action of the track than driving teeth whereby when abnormal load conditions cause the track to ride up the driving teeth, the overload teeth engage the grouser bars and effect the uninterrupted propulsion of the vehicle by means of their more stress resistant material, while under normal load driving conditions the drive is effected solely by means of the driving teeth.

In greater detail now and referring to the drawings a track vehicle constructed in accordance with the principles of this invention is indicated generally at 1 and includes an endless belt or tract 2 having a plurality of laterally spaced apart grouser bars 3 which are adapted to be engaged by the teeth 4, 4A of a driving wheel 5.

As has been mentioned the driving wheel 5 comprises two axially aligned and spaced apart sprockets 6 and 7 having projecting grouser bar engaging teeth 4, 4A of wear resistant and thus necessarily relatively resilient material. It is common in vehicles of this sort to use sprockets having driving teeth of heavy rubber because of the excellent wear resistant properties afforded by this material, and according to the manner of this invention under normal operating conditions (i.e., those conditions illustrated in Figures 3 and 4 of the drawings) these resilient teeth 4, 4A engage the grouser bars of the track and thus cause the vehicle to be propelled upon actuation of the driving wheel and sprocket.

The improvement which forms the subject matter of this invention lies in the overload sprocket 8 which is interposed between the sprockets 6 and 7 and preferably substantially medially therebetween. This overload sprocket is provided with teeth of greater load resistance than the rubber teeth 4, 4A and the overload teeth 9 are as may be seen by reference to Figure 3 or 4 in axial alignment with the pairs of driving teeth 4, 4A.

For reasons which will become apparent hereafter these teeth are of the same root diameter $D_r$ but of a greater addendum or overall diameter $D_A$ than that of the driving teeth $D_a$. The result of this relationship is that the overload teeth are higher and their grouser bar engaging surface is steeper than the drive teeth already described.

As has been stated above, during sudden overloading the stress on the belts can often become so high that the belts will become stretched within their elastic limits. This extends the pitch of the grouser and without the provision of the overload sprocket which forms the subject matter of this invention, because of the thus extended pitch of the belt, the belts will start climbing up the teeth of the drive sprocket. Because of the necessity of forming the drive teeth from wear resistant material, this necessarily resilient material is often unable to withstand this additional stress and the teeth bend and the sprockets slip.

The overload sprocket already described prevents this slipping by taking the load off the top of the drive teeth in the manner illustrated in Figures 3A and 4A, these overload sprocket teeth being so designed that under normal conditions they do not touch the track belt or grouser bars.

Because the overloadings of the class described do not normally last for any extended period, the elasticity in the track belts brings the belt back to the normal pitch and the belts travel down the overload sprocket to a position where the normal load is again taken by the driving teeth.

It will be appreciated that the overload sprocket to secure the full advantages offered by the invention should be formed of a stress resistant material without regard to its wear resistant properties. For this reason I have used steel overload sprockets formed with teeth as described above with excellent results.

The invention has been described with reference to preferred embodiments. It is to be understood, however, that the invention is not to be construed as limited to preferred embodiments nor to precise constructional details. Such embodiments of the invention as come within the scope and purview of the appended claims are to be considered part of this invention.

What I claim as my invention is:

1. A self laying track mechanism for tracked vehicles comprising a driving wheel and a track adapted to be driven thereby, said driving wheel comprising a pair of axially spaced apart sprockets having axially alined driving teeth thereon adapted to engage grouser bars on the tracks, an overload sprocket having overload teeth thereon, said overload teeth being so designed and disposed so as not to engage the grouser bars under normal driving conditions but to assume the load of the grouser bars under overload conditions under which the track stretches.

2. A self laying track mechanism for tracked vehicles comprising a driving wheel and a track adapted to be driven thereby, said driving wheel comprising a pair of axially spaced apart sprockets of relatively resilient and wear resistant material having axially alined driving teeth thereon adapted to engage grouser bars on the tracks, an overload sprocket having overload teeth thereon, said overload teeth being formed of material having a greater load resistance to the action of the track than said driving teeth and being so designed and disposed so as not to engage the grouser bars under normal driving conditions but to assume the load of the grouser bars under overload conditions under which the track stretches.

3. A self laying track mechanism for tracked vehicles comprising a driving wheel and a track adapted to be driven thereby, said driving wheel comprising a pair of axially spaced apart sprockets of relatively resilient and wear resistant material having axially alined driving teeth thereon adapted to engage grouser bars on the tracks, an overload sprocket located between the said two axially spaced apart sprockets, said overload sprocket having overload teeth in axial alinement with each axially alined pair of driving teeth and being of the same root diameter, but of greater addendum diameter than said driving teeth, said overload teeth being formed of material having a greater load resistance to the action of the track than said driving teeth and being so designed so as not to engage the grouser bars under normal drive conditions, but to assume the load of the grouser bars under overload conditions under which the track stretches.

4. A track mechanism as claimed in claim 3 wherein said overload sprocket is located substantially medially between said two axially spaced apart sprockets.

5. A track mechanism as claimed in claim 4 wherein said driving teeth are formed of material having the physical properties of hard rubber and said overload teeth are formed of material having the physical properties of steel.

References Cited in the file of this patent

UNITED STATES PATENTS

| 522,427 | Leggo | July 3, 1894 |
| 639,002 | Titus | Dec. 12, 1899 |
| 2,199,331 | Carlsson | Apr. 30, 1940 |

FOREIGN PATENTS

| 494,320 | Italy | May 19, 1954 |